106. COMPOSITIONS, COATING OR PLASTIC
82

Patented Feb. 16, 1943

2,311,272

UNITED STATES PATENT OFFICE 2,311,272

ADHESIVE

Willis C. Ware, Chicago, Ill., assignor, by mesne assignments, to Industrial Abrasives, Inc., Chicago, Ill., a corporation of Illinois No Drawing. Application February 6, 1939, Serial No. 254,807

9 Claims. (Cl. 106—82)

The present invention relates generally to adhesives. More particularly the invention relates to that type of adhesive which is designed primarily for use in bonding or uniting a coating of grit particles to a piece of flexible backing material in connection with the fabrication or manufacture of an abrasive element and includes liquid silicate of soda as the base thereof and a chemically active body forming agent in the form of an admixture of aluminum silicate, silica, calcium carbonate, or magnesium silicate.

One object of the invention is to provide an adhesive of this type which is exceedingly hard bonding, and is more efficient than previously designed adhesives as far as grit holding and bonding properties are concerned, by reason of the fact that the base of liquid silicate of soda comprises a mixture or combination of low ratio sodium silicate and high ratio sodium silicate.

Another object of the invention is to provide an adhesive of the type under consideration which in addition to the combined high and low ratio sodium silicate solutions and the chemically active body forming agent, includes a wetting agent for surface tension reducing purposes.

A further object of the invention is to provide an adhesive which is capable of drying at normal atmospheric temperatures and has certain advantakes over that which forms the subject matter of an application for United States Letters Patent filed by me on November 9, 1938, Serial No. 239,603.

Other objects of the invention and the various advantages and characteristics of the present adhesive will be apparent from a consideration of the following detailed description.

The invention consists in the adhesive which is hereinafter described in detail and is more particularly defined by claims at the conclusion hereof.

The adhesive which forms the subject matter of the invention has particular utility as a bonding or binding medium in connection with the fabrication of abrasive disks and like elements. It is of the so-called silicate of soda type and consists of a base of liquid silicate of soda, a body forming agent, a wetting agent, a toughening and hardening agent, and a coloring agent. The base is made of a mixture of a low ratio silicate of soda solution and a high ratio silicate of soda solution. The low ratio silicate of soda solution is employed for the reason that it chemically reacts with the body forming agent and gives the adhesive extremely great tenacity or holding properties as well as heat resisting properties. It is further employed because it acts as a plasticizer and thus eliminates brittleness. The high ratio solution of silicate of soda is employed for thinning purposes and to counteract the hydroscopic tendencies of the low ratio silicate of soda solution. The low ratio silicate of soda solution preferably is of approximately 60° Baumé and consists of one part sodium oxide ($Na_2O$) and 1.65 parts silica. By a low ratio silicate of soda solution it is to be understood that there shall be no more than two parts silica to one part sodium oxide. The high ratio solution of silicate of soda consists of one part sodium oxide ($Na_2O$) and 3.3 parts silica ($SiO_2$). By a high ratio silicate of soda preferably solution it is to be understood that there shall be more than two parts of silica to one part sodium oxide. Aluminum silicate is preferably used as the body forming agent and when mixed, as hereinafter described with the base, that is, the combination or mixture of the low ratio silicate of soda solution and the high ratio silicate of soda solution, produces an extremely tough sticky mass. As a result of the chemical action which gradually takes place between the body forming agent and the base, the adhesive when fully set is extremely hard bonding and has great grit gripping and retaining properties. By employing an extremely low ratio silicate of soda solution as part of the base the chemical action between the base and the body forming agent is materially expedited and the setting time for the adhesive as a whole is materially reduced. By using or employing the high ratio sodium silicate solution as part of the base any tendency of the low ratio solution to absorb such an amount of water as to cause the adhesive as a whole to lose its normal bonding properties is effectively counteracted or balanced. Instead of aluminum silicate, the body forming agent may be made of silica, calcium carbonate, or magnesium silicate, or a combination of these materials. For some types of adhesives a mixture of aluminum silicate and calcium carbonate is best inasmuch as the calcium carbonate in addition to reacting chemically with the base serves to make the adhesive water resistant and extremely tough. The wetting agent is preferably sulphonated castor oil. It serves to reduce the surface tension of the base solution and thus enables the adhesive to penetrate readily the pores or interstices of the flexible backing material with which the adhesive is used. Instead of sulphonated castor oil, sodium or potassium oleate soap, or sodium or potassium ricinoleate soap may be used as the wetting agent. Zinc oxide is preferably used as the toughening and hardening agent and this material in addition to adding toughness and hardness to the mixture serves to reduce the hydroscopic tendencies of the low ratio sodium silicate portion of the base solution. For the coloring agent raw or burnt umber or sienna is used. By reason of the fact that umber and sienna both contain a very high percentage of manganese oxide and iron oxide, the coloring agent regardless of which material is used reacts chemically with the low ratio silicate of soda and the body forming agent and causes extremely quick hardening of the adhesive as a whole.

The base, body forming agent, wetting agent, toughening and hardening agent, and coloring agent are preferably used in the following proportions.

| | Pounds |
|---|---|
| Base solution or material (35 to 50 pounds low ratio sodium silicate solution, 315 to 300 pounds high ratio solution of silicate of soda) | 350 |
| Body forming agent (aluminum silicate) | 100 |
| Wetting agent (sulphonated castor oil) | 1¾ |
| Toughening and hardening agent (zinc oxide) | 2 |
| Coloring agent (umber or sienna) | 25 |

In preparing the adhesive, the high and low ratio solutions of silicate of soda are first mixed together. Thereafter, the sulphonated castor oil, that is, the wetting agent, is added to the sodium silicate solutions and the mixture is stirred or thoroughly mixed together in any suitable agitating device. After the wetting agent has been thoroughly mixed with the base material, the body forming agent is added and mixed with the other ingredients. As a result of adding or mixing the sulphonated castor oil with the base before adding the body forming agent to the base there is an efficient dispersion of the body forming agent within the mixture of base and wetting agent when the agent is added to the mixture. Another advantage of adding the wetting agent to the base prior to mixing the body forming agent with the base is that when the body forming agent is added to the base, the chemical action therebetween is materially hastened. After the body forming agent has been added to and mixed with the mixture of base and wetting agent the zinc oxide is added and stirred into commingling relation with the mixture. The coloring agent due to the fact that it acts substantially immediately to effect setting of the adhesive is not added to the mixture of base, body forming agent, wetting agent, and toughening and hardening agent until the adhesive is ready for use. In order to obtain the desired results, it is necessary that there be no more than one-third as much body forming agent as base. By having three or more times as much base as body forming agent, the adhesive is capable of drying at normal atmospheric temperatures, and in addition is fully flexible, and in a fully set condition permits bending of the backing of the abrasive element with which it is employed. Furthermore the adhesive is sufficiently fluid to penetrate the pores or interstices of the piece of flexible backing material and there is such a chemical reaction between the low ratio sodium silicate solution and the body forming agent within the pores or interstices of the backing piece that the desired bonding or binding of the grit particles to the backing material is obtained.

The adhesive when the mixture of all the ingredients thereof is complete is brown in color. In using the adhesive to secure a coating of grit to a piece of backing material in connection with the fabrication or manufacture of an abrasive element, the adhesive is spread in the form of a thin coat over the piece of backing material. Thereafter the grit particles are spread over the adhesive coating and the adhesive is permitted to set by air drying. After setting of the adhesive the grit particles are fixedly secured or attached to the adhesive backing material. The adhesive after setting thereof has a melting point of approximately 2600° F. Because of its high melting point and the fact that the ingredients are all inorganic the adhesive is heat resistant and will not decompose or soften under friction produced heat.

Whereas the adhesive has been described as having the ingredients thereof mixed together in certain proportions, it is to be understood that except where the proportions have been described as critical other proportions than those specified may be used. For example, if the adhesive is to be used in extremely dry climates or locations the amount of low ratio sodium silicate solution may be increased and the amount of high ratio sodium silicate solution may be decreased. In humid or moist climates or locations it has been found in practice that it is necessary, in order to obtain satisfactory or proper results, to decrease the amount of low ratio sodium silicate solution and increase the amount of high ratio sodium silicate solution. It is also to be understood that the adhesive may be used as a sizing medium as well as for purposes other than bonding or uniting a coating of grit particles to a piece of backing material in connection with the fabrication of an adhesive element.

The present application is a continuation in part of an application for United States Letters Patent for Adhesives, filed by me July 18, 1936, serial No. 91,390.

Having thus described the invention, what I claim as new and desire to secure by Letters Patent is:

1. As a new composition of matter, a hard bonding heat resisting adhesive comprising a mixture of low ratio sodium silicate solution embodying no more than two parts silica to one part sodium oxide and a high ratio sodium silicate solution embodying more than two parts silica to one part sodium oxide, and a lesser amount by weight of a body forming agent chemically reactive with the low and high ratio sodium silicate mixture and selected from a group consisting of aluminum silicate, silica, calcium carbonate and magnesium silicate, the low ratio sodium silicate solution being in sufficient amount to act as a plasticiser for the material and eliminate brittleness and the high ratio sodium silicate solution being in sufficient amount to counteract or balance the hydroscopic tendencies of the low ratio solution in order that moisture absorption on the part of the last mentioned solution will not materially weaken or change the normal bonding properties of the material as a whole.

2. As a new composition of matter, a hard bonding heat resisting adhesive comprising a mixture of a relatively small amount of low ratio sodium silicate solution embodying one part sodium oxide to less than two parts silica and a greater amount of high ratio sodium silicate solution embodying one part of sodium oxide to more than two parts silica, an extremely small quantity of a wetting agent capable of reducing the surface tension of the mixture, and an admixture of no more than one-third the amount by weight of a body forming agent chemically reactive with the mixture and selected from the group consisting of aluminum silicate, silica, calcium carbonate and magnesium silicate.

3. As a new composition of matter, a hard bonding heat resisting adhesive comprising a mixture of between 35 to 50 parts of a low ratio sodium silicate solution embodying one part sodium oxide to less than two parts of silica and between 315 to 300 parts of high ratio sodium silicate solution embodying one part of sodium oxide to more than two parts of silica, and an admixture of no more than one-third the amount by weight of a body forming agent chemically reactive with the mixture and selected from the group consisting of aluminum silicate, silica, calcium carbonate and magnesium silicate.

4. As a new composition of matter, a hard bonding heat resisting adhesive comprising a mixture of low ratio sodium silicate solution embodying no more than two parts of silica to one part of sodium oxide and a high ratio sodium silicate solution embodying more than two parts of silica to one part of sodium oxide, a body forming agent chemically reactive with the mixture and selected from the group consisting of aluminum silicate, silica, calcium carbonate and magnesium silicate, and a small amount of a coloring pigment also chemically reactive with said mixture and selected from the group composed of umber and sienna, the low ratio sodium silicate solution being in sufficient amount to act as a plasticiser for the adhesive and eliminate brittleness and the high ratio sodium silicate solution being in sufficient amount to counteract or balance the hydroscopic tendencies of the low ratio solution in order that moisture absorption on the part of the last mentioned solution will not materially weaken or change the normal bonding properties of the adhesive as a whole.

5. As a new composition of matter, a hard bonding heat resisting adhesive comprising in substantially the proportions set forth 350 parts of a mixture of between 35 to 50 parts of low datio sodium silicate solution embodying one part of sodium oxide to less than two parts of silica and between 315 to 300 parts of high ratio sodium silicate solution embodying one part of sodium oxide to more than two parts of silica, 1¾ parts of a wetting agent capable of reducing the surface tension of the mixture, 100 parts of a body forming agent chemically reactive with the mixture and selected from the group consisting of aluminum silicate, silica, calcium carbonate and magnesium silicate, and also 25 parts of a coloring pigment selected from the group consisting of umber and sienna.

6. As a new composition of matter, a hard bonding heat resisting adhesive comprising a mixture of a relatively small amount of low ratio sodium silicate solution embodying one part of sodium oxide to less than two parts of silica, and a greater amount of high ratio sodium silicate solution embodying more than one part of sodium oxide to two parts of silica, an extremely small quantity of sulphonated castor oil, and an admixture of aluminum silicate in no greater amount by weight than one-third the amount of the mixture.

7. As a new composition of matter, a hard bonding heat resisting adhesive comprising a mixture of low ratio sodium silicate solution embodying no more than two parts of silica to one part of sodium oxide and a high ratio sodium silicate solution embodying more than two parts of silica to one part of sodium oxide, an admixture of no more than one-third the amount by weight of a body forming agent chemically reactive with the mixture and selected from the group consisting of aluminum silicate, silica, calcium carbonate and magnesium silicate, and a small quantity of a toughening agent capable of chemically reacting with the mixture and reducing the hydroscopic tendencies of the low ratio sodium silicate solution, the low ratio sodium silicate solution being in sufficient amount to act as a plasticiser for the adhesive and eliminate brittleness and the high ratio sodium silicate solution being in sufficient amount to counteract or balance the hydroscopic tendencies of the low ratio solution in order that moisture absorption on the part of the last mentioned solution will not materially weaken or change the normal bonding properties of the adhesive as a whole.

8. As a new composition of matter, a hard bonding heat resisting adhesive comprising a mixture of a relatively small amount of low ratio sodium silicate solution embodying no more than two parts of silica to one part of sodium oxide and a greater amount of high ratio sodium silicate solution embodying more than two parts of silica to one part of sodium oxide, an admixture of no more than one-third the amount by weight of a body forming agent chemically reactive with the mixture and selected from the group consisting of aluminum silicate, silica, calcium carbonate and magnesium silicate, an extremely small quantity of a toughening agent capable of chemically reacting with the solution and reducing the hydroscopic tendencies of the low ratio sodium silicate solution, and a larger quantity of a coloring pigment selected from the group consisting of umber and sienna.

9. As a new composition of matter, a hard bonding heat resisting adhesive comprising in substantially the proportions set forth, 350 parts of a mixture of between 35 to 50 parts of low ratio sodium silicate solution embodying one part of sodium oxide to less than two parts of silica and between 315 to 300 parts of high ratio sodium silicate solution embodying one part of sodium oxide to more than two parts of silica, 1¾ parts of wetting agent, 100 parts of a body forming agent chemically reactive with the mixture and selected from the group consisting of aluminum silicate, silica, calcium carbonate and magnesium silicate, 2 parts of zinc oxide, and 25 parts of a coloring agent selected from the group consisting of umber and sienna.

WILLIS C. WARE.